United States Patent
Shostak

(10) Patent No.: US 9,276,642 B2
(45) Date of Patent: Mar. 1, 2016

(54) COMPUTING DEVICE HAVING MULTIPLE CO-LOCATED ANTENNAS

(71) Applicant: GOOGLE TECHNOLOGY HOLDINGS LLC, Mountain View, CA (US)

(72) Inventor: Pavel A Shostak, Evanston, IL (US)

(73) Assignee: Google Technology Holdings LLC, Mountain View, CA (US)

(*) Notice: Subject to any disclaimer, the term of this patent is extended or adjusted under 35 U.S.C. 154(b) by 22 days.

(21) Appl. No.: 14/444,369

(22) Filed: Jul. 28, 2014

(65) Prior Publication Data

US 2015/0381239 A1    Dec. 31, 2015

Related U.S. Application Data

(60) Provisional application No. 62/017,297, filed on Jun. 26, 2014.

(51) Int. Cl.
| | |
|---|---|
| *H01J 7/02* | (2006.01) |
| *H01Q 1/24* | (2006.01) |
| *H01Q 1/22* | (2006.01) |
| *H01Q 7/06* | (2006.01) |
| *H04B 5/00* | (2006.01) |
| *H02J 7/02* | (2006.01) |

(52) U.S. Cl.
CPC ........... *H04B 5/0037* (2013.01); *H01Q 1/2266* (2013.01); *H01Q 1/243* (2013.01); *H01Q 7/06* (2013.01); *H02J 7/025* (2013.01); *H04B 5/0081* (2013.01)

(58) Field of Classification Search
CPC .......... H01F 38/14; H01F 41/00; H02J 5/005; H02J 7/025; H02J 17/00; H01Q 1/362; A61F 2250/0002; A61N 1/37229
See application file for complete search history.

(56) References Cited

U.S. PATENT DOCUMENTS

| | | | | |
|---|---|---|---|---|
| 5,397,986 | A * | 3/1995 | Conway ................. | G01V 3/104 324/202 |
| 2004/0004581 | A1* | 1/2004 | Jenwatanavet ......... | H01Q 5/357 343/895 |
| 2014/0028111 | A1* | 1/2014 | Hansen ................. | H01F 38/414 307/104 |
| 2015/0130979 | A1* | 5/2015 | Huang .................... | H01F 38/14 348/333.01 |

* cited by examiner

*Primary Examiner* — Sujatha Sharma
(74) *Attorney, Agent, or Firm* — Faegre Baker Daniels LLP

(57) ABSTRACT

A computing device (102) includes multiple antennas, one antenna for wireless communication and another antenna for wireless charging. Each antenna is one of multiple coils that are co-located at a particular area of a housing of the computing device. These multiple coils can be configured in various different manners, and are configured such that a first of the multiple coils has an outer periphery and an inner boundary. A second of the multiple coils includes a first portion, a second portion, and a third portion. The first portion of the second coil is positioned about the outer periphery of the first coil, the second portion of the second coil is positioned within the inner boundary of the first coil, and the third portion of the second coil traverses the first coil and interconnects the first and second portions of the second coil.

20 Claims, 11 Drawing Sheets

COMPUTING DEVICE HAVING MULTIPLE CO-LOCATED ANTENNAS

RELATED APPLICATIONS

This application claims priority to U.S. Provisional Patent Application Ser. No. 62/017,297 filed on Jun. 26, 2014, entitled "Portable Device with Different Antenna Systems Co-Located at or Near a Housing Surface", which is incorporated by reference herein in its entirety.

BACKGROUND

As technology has advanced, the functionality provided by computing devices has increased. This functionality includes different types of wireless functionality, such as allowing computing devices to communicate with other devices wirelessly, allowing computing devices to wirelessly charge their batteries, and so forth. To support this wireless functionality, a computing device typically includes a different antenna for each different type of wireless functionality. Users oftentimes desire to associate the same location of their computing device, such as the central area of a back of the computing device, with different wireless functionality. However, it can be difficult to include two different antennas in the same location of a computing device.

BRIEF DESCRIPTION OF THE DRAWINGS

Embodiments of a computing device having multiple co-located antennas are described with reference to the following drawings. The same numbers are used throughout the drawings to reference like features and components.

DETAILED DESCRIPTION

A computing device having multiple co-located antennas is discussed herein. A computing device supports both wireless communication (e.g., near field communication (NFC)) and wireless charging (WC). Near field communication is a wireless communication protocol for devices to communicate with one another. In order for two devices to communicate with one another using near field communication, the two devices typically must be in close physical proximity of one another. Oftentimes users utilize near field communication by placing the devices in physical contact with each other.

Wireless charging is an inductive charging technology that utilizes an electromagnetic field to transfer energy between devices. For example, an inductive charging device may form an inductive coupling with a smartphone, tablet, or other portable device to charge a battery of the portable device. Similar to near field communication, wireless charging is typically performed when the two devices are in close physical proximity of one another, typically less than 10 cm apart.

Using the techniques discussed herein, a computing device includes multiple antennas—one for wireless communication and one for wireless charging. Each antenna is a coil that is located at a particular area (e.g., a central area) of a housing of the computing device. The antennas are referred to as being co-located due to both antennas being located in the same area. These multiple coils are configured such that a first coil of the multiple coils has an outer periphery and an inner boundary. A first portion of a second coil of the multiple coils is positioned about the outer periphery of the first coil, a second portion of the second coil is positioned within the inner boundary of the first coil, and a third portion of the second coil traverses the first coil and interconnects the first and second portions of the second coil.

Using the techniques discussed herein, the multiple antennas are co-located in the same area, improving the performance of the functionality (e.g., wireless communication) associated with one antenna while reducing performance degradation of the functionality (e.g., wireless charging) associated with the other antenna. In one or more embodiments, the two antennas are located in approximately a central area of the housing of a computing device because users are oftentimes accustomed to positioning their computing device so that approximately the central area of the computing device is adjacent to the other device with which communication is to be performed or from which charging is to performed. Furthermore, with many portable devices, the front side of the device is dominated by a touch screen, and thus the multiple antennas are co-located at or near the back housing of the computing device.

Figure 1:
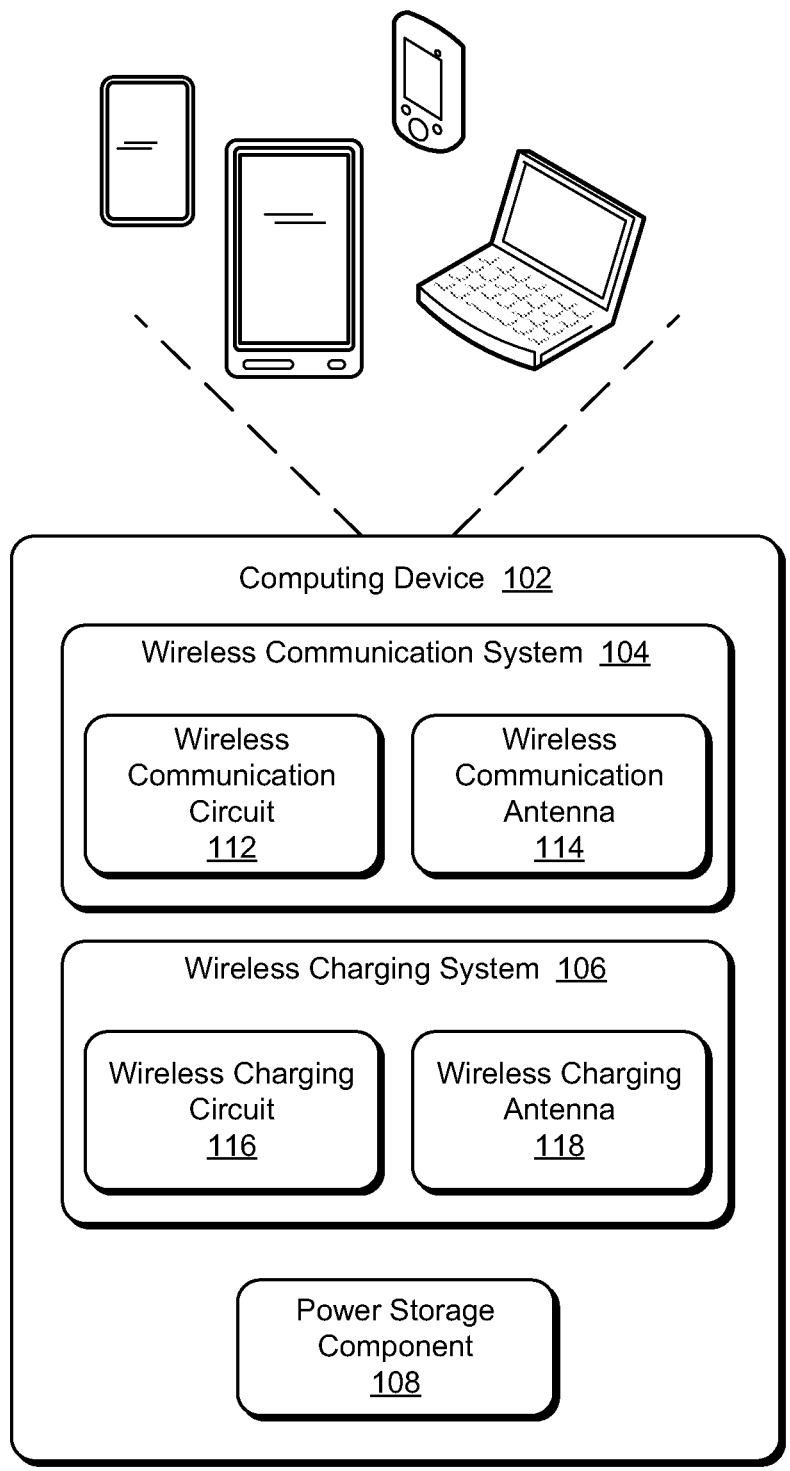
FIG. 1 illustrates an example computing device having multiple co-located antennas in accordance with one or more embodiments.

FIG. 1 illustrates an example computing device 102 having multiple co-located antennas in accordance with one or more embodiments. The computing device 102 can be any of a variety of different types of devices, such as a laptop computer, a cellular or other wireless phone, a tablet device, a phablet device, a personal digital assistant, an entertainment device, an audio or video playback device, a personal navigation device, a touch screen input device, a stylus or pen-based input device, and so forth. The computing device 102 can take the form of a variety of different form factors, such as bar, tablet, flip/clam, slider, rotator, wearable, and so forth. The computing device 102 is oftentimes a portable or mobile device that is designed to be easily moved to different locations. However, the computing device 102 can alternatively be a device designed to be stationary, such as a desktop computer, server computer, and so forth.

The computing device 102 includes a wireless communications system 104, a wireless charging system 106, and a power storage component 108. The wireless communication system 104 allows the computing device 102 to communicate with one or more other devices using various wireless communication protocols. In one or more embodiments, the wireless communication system 104 supports a near field communication protocol. For example, wireless communication protocols supported by the wireless communication system 104 can be protocols adhering to the ISO/IEC 18000-3 (2010) standard, the ISO/IEC 18092 (2013) standard, the ECMA-340 (2013) standard, the ISO/IEC 21481 (2012) standard, the ISO/IEC 14443 (2008, 2010, 2011) standard, or the ECMA 352 (2013) standard. Alternatively, the wireless communication system 104 can support various other wireless communication protocols or standards.

The wireless charging system 106 implements inductive charging technology that utilizes an electromagnetic field to wirelessly receive energy from an external power source. The received energy is stored in power storage component 108. The power storage component 108 can be any of a variety of components capable of storing energy received by the wireless charging system 106. In one or more embodiments, the power storage component 108 is a battery (e.g., a lithium ion battery, a lithium polymer battery, a nickel metal hydride battery, a nickel cadmium battery, and so forth). Alternatively, the power storage component 108 can be other types of components.

The wireless communication system 104 includes a wireless communication circuit 112 and a wireless communication antenna 114. The wireless communication antenna 114 is a coil that receives wireless signals communicated from one or more other devices (not shown in FIG. 1) and sends wireless signals to one or more other devices (not shown in FIG. 1). The receiving and sending of wireless signals using the wireless communication antenna 114 is managed by the wireless communication circuit 112, allowing the wireless communication circuit 112 to perform or otherwise facilitate wireless communication (e.g., near field communication) with other devices.

The wireless charging system 106 includes a wireless charging circuit 116 and a wireless charging antenna 118. The wireless charging antenna 118 is a coil that receives energy from an external power source (not shown in FIG. 1). The wireless charging antenna 118 is co-located with the wireless communication antenna 114, as discussed in more detail below. The receiving of energy using the wireless charging antenna 118 is managed by the wireless charging circuit 116, which stores the received energy in the power storage component 108 (e.g., recharging the battery of the computing device 102).

Figure 2:
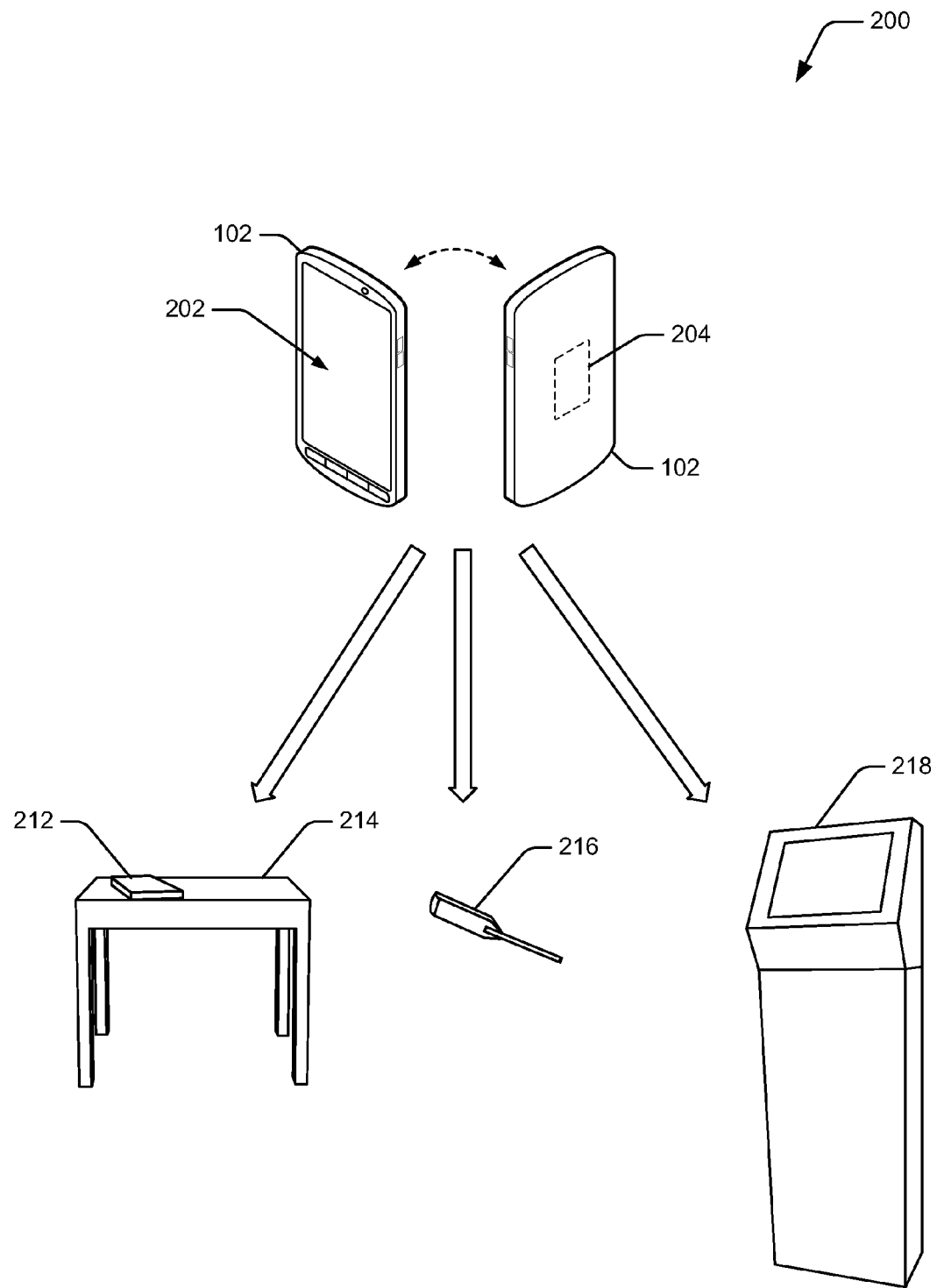
FIG. 2 illustrates an example environment in which a computing device having multiple co-located antennas can be used in accordance with one or more embodiments.

FIG. 2 illustrates an example environment 200 in which a computing device 102 can be used in accordance with one or more embodiments. The computing device 102 includes a display 202 and an antenna apparatus 204. The display 202 can implement touchscreen functionality and can be configured as any suitable type of display, such as an organic light-emitting diode (OLED) display, active matrix OLED display, liquid crystal display (LCD), in-plane shifting LCD, and so on. The display 202 is situated on one side or surface of the computing device 102 (the front of the computing device 102). The antenna apparatus 204 includes the wireless communication antenna 114 and the wireless charging antenna 118 of FIG. 1. The antenna apparatus 204 is situated within the housing of the computing device 102, and is situated at or near surface of the opposite side of the computing device 102 (the back or rear of the computing device 102). The antenna apparatus 204 is illustrated in FIG. 2 with dashed lines because the antenna apparatus 204 is situated within the housing of the computing device 102 and is typically not visible from external to the housing of the computing device 102.

The antenna apparatus 204 is illustrated in FIG. 2 as being situated in a central region of the rear surface of the computing device 102 (e.g., at approximately the center of the back of the computing device 102). However, the antenna apparatus 204 can alternatively be situated in other areas of the computing device 102. For example, the antenna apparatus 204 can be situated at or near the back surface of the computing device 102 at approximately the top of the back of the computing device 102, in one of the corners of the back of the computing device 102, and so forth. Additionally, situations can arise in which the antenna apparatus 204 is situated at or near a different surface of the computing device 102, such as at or near the front of the computing device 102 (e.g., in situations in which the display 202 does not encompass substantially all of the front of the computing device 102).

FIG. 2 also illustrates a wireless charging base 212 resting on a table 214, a wireless headset 216, and a wireless kiosk 218. The computing device 102 can be wirelessly charged by placing the computing device 102 in close physical proximity to the wireless charging base 212. For example, the user can lay the computing device 102 on the wireless charging base 212 so that the back of the computing device 102 is resting on the top of the wireless charging 212.

The computing device can also wirelessly communicate with the wireless headset 216 by placing the computing device 102 in close physical proximity to the wireless headset 216. For example, the wireless headset 216 can be a Bluetooth headset, and the user can position the wireless headset 216 next to (e.g., physically touching) the back of the computing device 102 at approximately the antenna apparatus 204, facilitating pairing of the wireless headset 216 with the computing device 102 by allowing the computing device 102 and the wireless headset 216 to wirelessly communicate with one another using NFC. Similarly, the computing device can also wirelessly communicate with the wireless kiosk 218 by placing the computing device 102 in close physical proximity to the wireless kiosk 218. For example, the user can position the computing device 102 so that the back of the computing device 102 is next to (e.g., physically touching) the wireless kiosk 218, allowing the computing device 102 and the wireless kiosk 218 to wirelessly communicate with one another using NFC.

Figure 3:
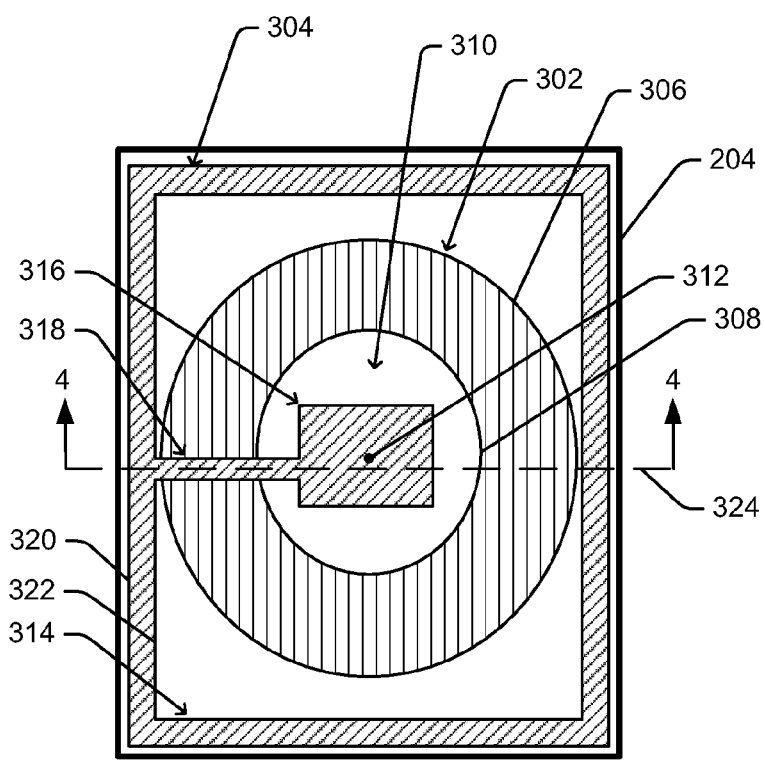
FIG. 3 illustrates an example layout of an antenna apparatus in which multiple antennas are co-located in accordance with one or more embodiments.

FIG. 3 illustrates an example layout of an antenna apparatus 204 in which multiple antennas are co-located in accordance with one or more embodiments. The example antenna apparatus 204 includes two different antennas 302 and 304. The antenna 302, illustrated with a vertical line pattern, is substantially circular in shape and can be the wireless charging antenna 118. The antenna 302 can be implemented in various manners, such as a coil that is looped around a center of the circular shape multiple times. Although the antenna 302 is illustrated as being substantially circular The antenna 302 includes an outer periphery 306, which refers to the outer part of the circular shape (e.g., the perimeter of the circular shape) that is the antenna 302. The antenna 302 also includes an inner boundary 308, which refers to the inner part of the circular shape that is the antenna 302. Within the inner boundary 308 is a center area 310 of the antenna apparatus 204. The center area 310 forms a geometric shape (e.g., a substantially circular shape), and that geometric shape has a center that is also referred to as the center of the center area 310. For example, the center of the center area 310 can be the location 312.

The antenna 304, illustrated with a 45-degree angled line pattern, can be the wireless communication antenna 114. The antenna 304 is one continuous loop that includes multiple portions 314, 316, and 318. The portion 314 is positioned about the outer periphery 306 of the antenna 302. The portion 314 is illustrated as being substantially rectangular in shape, although the portion 314 can take other shapes, such as being substantially circular in shape, being substantially elliptical in shape, and so forth. The portion 314 can be implemented in various manners, such as a coil that is looped around a center of the rectangular shape multiple times. The portion 314 includes an outer periphery 320, which refers to the outer part of the rectangular shape (e.g., the perimeter of the rectangular shape) that is the portion 314. The portion 314 also includes an inner boundary 322, which refers to the inner part of the rectangular shape that is the portion 314. The antenna 302 is situated within the inner boundary 322 of the portion 314.

The portion 316 is positioned within the inner boundary 308 of the antenna 302. The portion 316 is illustrated as being substantially rectangular in shape, although the portion 316 can take other shapes, such as being substantially circular in shape, being substantially elliptical in shape, and so forth. The portion 316 can be implemented in various manners, for example as a coil that is looped around the location 312 one or more times, or as a linear segment.

The portion 318 traverses the antenna 302, interconnecting the portions 314 and 316 of the antenna 304. The portion 318 can be positioned on top of the antenna 302 (e.g., between the antenna 302 and the back surface of the computing device 102 implementing the antenna apparatus 204), or can be positioned underneath the antenna 302 (e.g., so that the antenna 302 is situated between the portion 318 and the back surface of the computing device 102 implementing the antenna apparatus 204). A dielectric or shield material can be positioned between the portion 318 and the antenna 302 to prevent the portion 318 and antenna 302 from coming into physical contact with one another.

The portion 318 is illustrated in FIG. 3 as traversing the antenna 302 along the left-hand side of the antenna 302. It should be noted that the illustrated location where the portion 318 traverses the antenna 302 is an example, and that the antenna 302 can be traversed at other locations. For example, the portion 318 can traverse the antenna 302 along the right-hand side of the antenna 302, along the top of the antenna 302, and so forth.

It should be noted that a separation is maintained between the antenna 302 and the portion 316 of the antenna 304, as well as between the antenna 302 and the portion 314 of the antenna 304. Maintaining this separation prevents the magnetic fields of the antenna 302 and the antenna 304 from interfering with one another by decreasing the mutual coupling between the two coils. In one or more embodiments this separation is at least approximately 2 millimeters, although other amounts of separation can alternatively be used.

In one or more embodiments, a wireless charging ferrite is positioned adjacent to the wireless charging antenna (e.g., antenna 302), for example underneath the wireless charging antenna so that the wireless charging antenna is situated between the wireless charging ferrite and a surface (e.g., the back surface) of the computing device 102 implementing the antenna apparatus 204. Additionally, in one or more embodiments a wireless communication ferrite is positioned adjacent to the wireless communication antenna (e.g., antenna 304), for example underneath the wireless communication antenna so that the wireless communication antenna is situated between the wireless communication ferrite and a surface (e.g., the back surface) of the computing device 102 implementing the antenna apparatus 204. These ferrites are made of a ferrite shield material selected to shield the magnetic field of the wireless communication system and the wireless charging system from nearby metallic materials that dissipate the field via formation of eddy currents. The ferrite shield material may be comprised of sintered iron (Fe) in rigid or flexible sheets, polymeric magnetic sheets, or other constructions. The primary magnetic material or combination of materials (for example, Fe, Ni, Mg, etc.) in the ferrite shield material may be chosen to improve the shielding performance for a particular operating frequency depending on which technology is being considered (for example, wireless charging or wireless communication).

In one or more embodiments, each antenna 302 and 304 is a coil and the antenna apparatus 204 includes one ferrite (e.g., the wireless charging ferrite) designed for operation of the antenna 302 positioned adjacent to the antenna 302, and another ferrite (e.g., the wireless communication ferrite) designed for operation of the antenna 304 positioned adjacent to the portions 314 and 316 of the antenna 304. A ferrite being designed for operation of a particular antenna 302 or 304 refers to the ferrite being designed or constructed to improve shielding performance for a particular operating frequency of the antenna 302 or 304 that the ferrite is positioned adjacent to. Different materials are chosen for the different ferrites based on which of the antenna 302 or 304 the ferrite is positioned adjacent to. Thus, the ferrite positioned adjacent to the antenna 302 is different than the ferrite positioned adjacent to the portions 314 and 316 of the antenna 316. Since the portion 318 of the antenna 304 traverses the antenna 302, the ferrite designed to improve shielding of the antenna 302 may be positioned adjacent to the antenna 302 and the portion 318 of the antenna 304.

Figure 4:
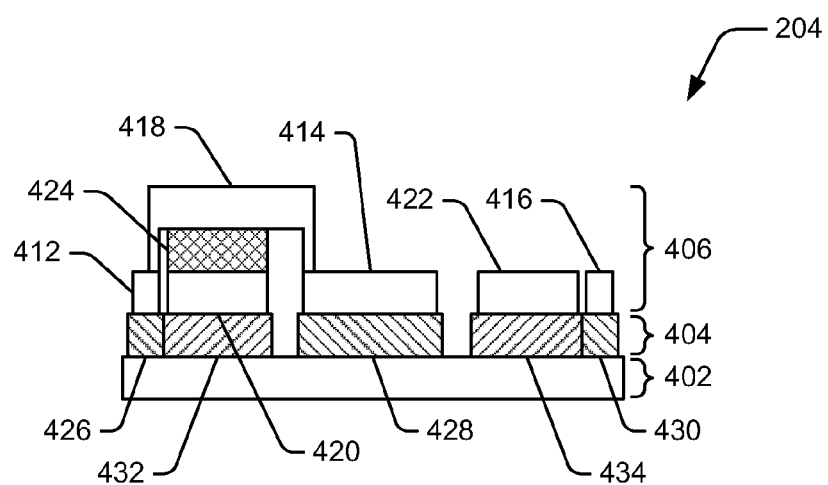
FIG. 4 illustrates a cross section view of an example antenna apparatus in accordance with one or more embodiments.

FIG. 4 illustrates a cross section view of an example antenna apparatus in accordance with one or more embodiments. FIG. 4 as illustrated is a cross section view of the antenna apparatus 204 of FIG. 3 along the line 324 of FIG. 3 in the direction indicated as 4. The antenna apparatus 204 illustrated in FIG. 4 includes a base layer 402, a ferrite layer 404, and a coil layer 406. In one or more embodiments, of the three layers 402, 404, and 406, the base layer 402 is the layer furthest from the housing of the computing device 102 and the coil layer 406 is the layer closest to the housing of the computing device 102 (e.g., the housing of the back of the computing device 102). Thus, the ferrite layer 404 is positioned at a side of the coil layer 406 opposite the housing of the computing device 102 (e.g., the housing of the back of the computing device 102).

The base layer 402 can be any of a variety of rigid or flexible sheets made of any of a variety of non-conductive materials. The base layer 402 optionally contains an adhesive material so as to adhere the coils to a structure of the computing devices 102. Alternatively, no such base layer 402 may be included in the antenna apparatus 204.

The coil layer 406 includes two coils, one of which is the antenna 302 and the other of which is the antenna 304. The coil layer 406 includes parts 412, 414, 416, and 418 that are parts of the antenna 304. The parts 412 and 416 are parts of the portion 314 of the antenna 304, the part 414 is part of the portion 316 of the antenna 304, and the part 418 is part of the portion 318 of the antenna 304. The coil layer 406 also includes parts 420 and 422, each of which is part of the antenna 302. A dielectric or shield material 424 (illustrated with a cross-hatching pattern) is positioned between the part 418 and the part 420 to prevent the part 418 and the part 420 from coming into physical contact with one another. The part 418 is illustrated as being positioned on top of the part 420 (e.g., between the part 420 and the back surface of the computing device 102 implementing the antenna apparatus 204). Alternatively, the part 418 can be positioned underneath the part 420 (e.g., so that the part 420 is situated between the part 418 and the back surface of the computing device 102 implementing the antenna apparatus 204), with the dielectric or shield material 424 being positioned between the part 420 and the part 418.

The ferrite layer 404 includes two different ferrite shield materials. The ferrite layer includes parts 426, 428, and 430, illustrated with a 45-degree angled line (from top left to bottom right) pattern, that are adjacent to parts 412, 414, and 416, respectively, of the coil layer 406. The parts 426, 428, and 430 of the ferrite layer 404 are designed for operation of the antenna 304 due to the parts 426, 428, and 430 being adjacent to the parts 412, 414, and 416. As illustrated, the parts 426, 428, and 430 are slightly wider (e.g., approximately 1-2 millimeters) than the parts 412, 414, and 416, respectively, extending beyond the edges of the parts 412, 414, and 416 to improve the shielding provided by the ferrite layer 404.

The ferrite layer also includes parts 432 and 434, illustrated with a 45-degree angled line (from bottom left to top right) pattern, that are adjacent to parts 420 and 422, respectively, of the coil layer 406. The parts 432 and 434 of the ferrite layer 404 are designed for operation of the antenna 302 due to the parts 432 and 434 being adjacent to the parts 420 and 422. As illustrated, the parts 432 and 434 are slightly wider (e.g., approximately 1-2 millimeters) than the parts 420 and 422, respectively, extending beyond the edges of the parts 420 and 422 to improve the shielding provided by the ferrite layer 404. Thus, the parts 426, 428, and 430 are made of one type of ferrite (including materials designed to improve shielding of the antenna 304), and the parts 432 and 434 are made of another type of ferrite (including materials designed to improve shielding of the antenna 302).

FIGS. 5-10 illustrate example antenna apparatus in which multiple antennas are co-located in accordance with one or more embodiments. The antenna apparatus illustrated in each of FIGS. 5-10 is a different antenna apparatus, each of which is an example of the antenna apparatus 204.

Figure 5:
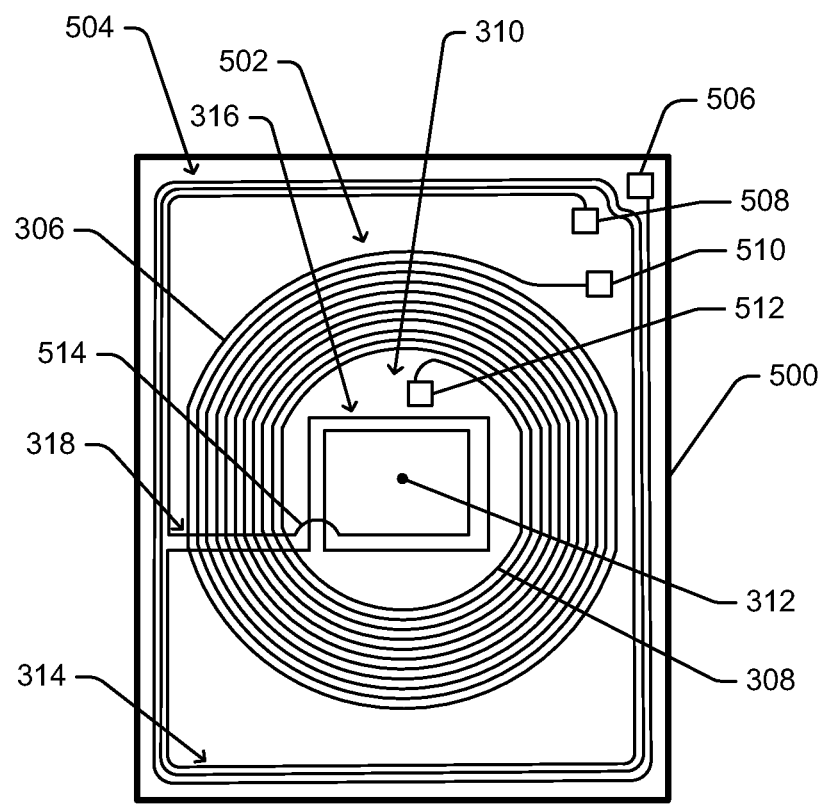
FIGS. 5, 6, 7, 8, 9, and 10 illustrate different example antenna apparatus in which multiple antennas are co-located in accordance with one or more embodiments.

FIG. 5 illustrates an example antenna apparatus 500 in which multiple antennas are co-located in accordance with one or more embodiments. The antenna apparatus 500 includes a wireless charging antenna that is a wireless charging coil 502 (e.g., the antenna 302 of FIG. 3) and a wireless communication antenna that is a wireless communication coil 504 (e.g., the antenna 304 of FIG. 3). Each of the coils 502 and 504 is a trace made up of multiple loops around the center area 310 of the antenna apparatus 500 (i.e., more than 360 degrees). These traces can be made of various different materials, such as copper, silver, or other conducting material.

The wireless charging coil 502 has an outer periphery 306 (e.g., the outer loop of the wireless charging coil 502) and an inner boundary 308 (e.g., the inner loop of the wireless charging 502). The wireless communication coil 504 includes multiple portions 314, 316, and 318. The portion 314 is positioned about the outer periphery 306 of the wireless charging coil 502. The portion 316 is positioned within the inner boundary 308 of the wireless charging coil 502. The portion 318 traverses the wireless charging coil 302, interconnecting the portions 314 and 316 of the wireless communication coil 504.

The wireless communication coil 504 includes communication connector contacts 506 and 508 for coupling to a wireless communication circuit (e.g., the wireless communication circuit 112 of FIG. 1). The wireless charging coil 502 includes wireless charging connector contacts 510 and 512 for coupling to a wireless charging circuit (e.g., the wireless charging circuit 116 of FIG. 1).

As shown in FIG. 5, the portion 316 of the wireless communication coil 504 forms a shape completely about location 312 (the center of the center area 310) of the antenna apparatus 500 (e.g., forms at least one loop around the location 312). As illustrated, the portion 316 forms multiple loops around the location 312 (i.e., more than 360 degrees). Although two loops are illustrated, the portion 316 can alternatively form three or more loops around the location 312. The portion 316 includes a jumper 514 to interconnect two separated ends, by passing over or under one or more intervening traces of the portion 316. The jumper 514 can be positioned on top of or over the intervening trace of the portion 316 (e.g., between the intervening trace of the portion 316 and the back surface of the computing device 102 implementing the antenna apparatus 500), or can be positioned below or underneath the intervening trace of the portion 316 (e.g., so that the intervening trace of the portion 316 is situated between the jumper 514 and the back surface of the computing device 102 implementing the antenna apparatus 500).

It should be noted that the winding orientation (for example, clockwise or counterclockwise) of the portion 314 of the wireless communication coil 504 and the portion 316 of the wireless communication coil 504 is kept the same in the example of FIG. 5. Keeping the winding orientation the same allows the magnetic field generated by each of the portions 314 and 316 to combine constructively in the center area 310 of the antenna apparatus 500. By preserving the trace winding orientation/direction of the coils in the portions 314 and 316, the radiated magnetic field can be greater due to the superposition of the fields from the two coils than if the orientation/direction of the coils in the portions 314 and 316 were different.

Figure 6:
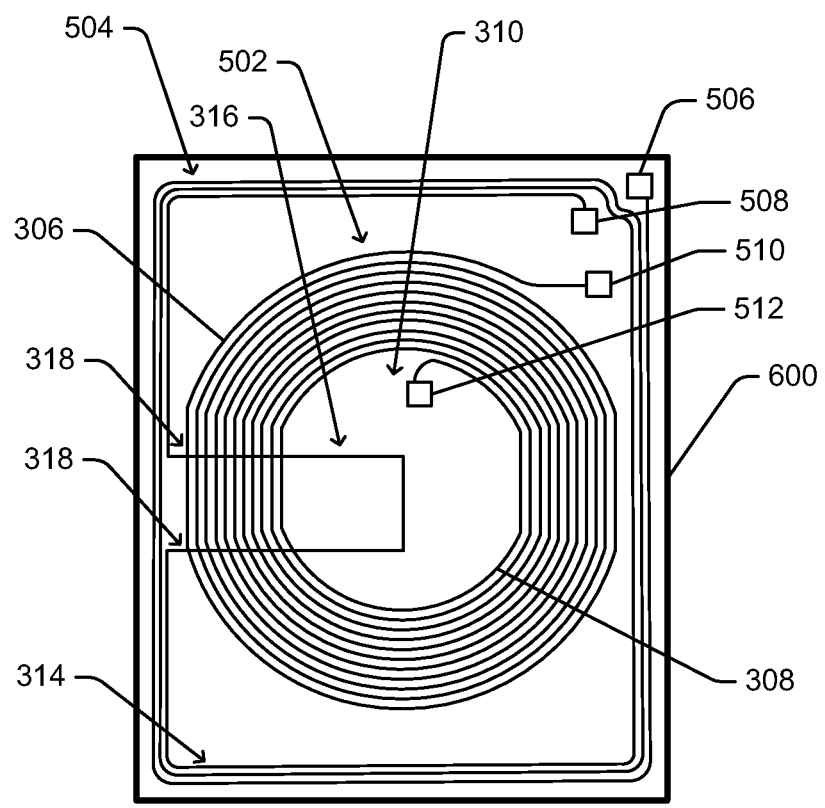

FIG. 6 illustrates an example antenna apparatus 600 in which multiple antennas are co-located in accordance with one or more embodiments. The antenna apparatus 600 of FIG. 6 is analogous to the antenna apparatus 500 of FIG. 5. The antenna apparatus 600 includes a wireless charging antenna that is the wireless charging coil 502 having the outer periphery 306 (e.g., the outer loop of the wireless charging coil 502) and the inner boundary 308 (e.g., the inner loop of the wireless charging 502). The antenna apparatus 600 also includes a wireless communication antenna that is the wireless communication coil 504 (e.g., the antenna 304 of FIG. 3) including portions 314, 316, and 318. The antenna apparatus 600 also includes communication connector contacts 506 and 508 for coupling to a wireless communication circuit and wireless charging connector contacts 510 and 512 for coupling to a wireless charging circuit.

The antenna apparatus 600, however, differs from the antenna apparatus 500 of FIG. 5 in the configuration of the portion 316 of the wireless communication coil 504. Rather than multiple loops included in the antenna apparatus 500, the portion 316 of the wireless communication coil in the antenna apparatus 600 forms a linear segment at or near (e.g., within a threshold distance of) a central portion (i.e., the center of the center area 310) within the inner boundary 308 of the wireless charging coil 502. It should be noted that this design of the antenna apparatus 600 does not require a jumper for the portion 316 (e.g., no jumper analogous to the jumper 514 of FIG. 5 need be included in the antenna apparatus 600). The portion 316 of the of the antenna apparatus 600 forms a shape that is less than completely about the center of the center area 310 of the antenna apparatus 600 (e.g., the portion 316 does not form at least one loop around the center of the center area 310).

Additionally, the antenna apparatus 600 differs from the antenna apparatus 500 of FIG. 5 in the distance between the traces in the portion 318 that traverse the wireless charging coil 502. As illustrated in FIG. 6, the distance between the traces in the portion 318 of the antenna apparatus 600 is greater than the distance between the traces in the portion 318 of the antenna apparatus 500.

Although illustrated as a linear segment at or near the central portion within the inner boundary 308, the portion 316 can alternatively be positioned in other locations within the inner boundary 308. Additionally, although illustrated as a substantially vertical linear segment, the portion 316 can alternatively be formed having different angles (e.g., a substantially 45-degree linear segment at or near a central portion within the inner boundary 308).

Figure 7:
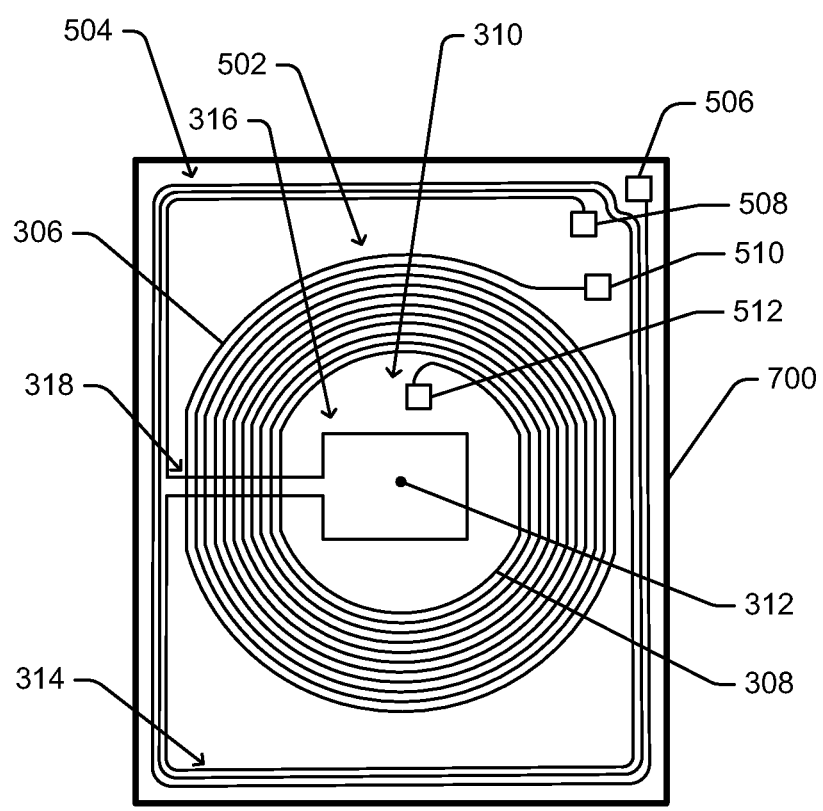

FIG. 7 illustrates an example antenna apparatus 700 in which multiple antennas are co-located in accordance with one or more embodiments. The antenna apparatus 700 of FIG. 7 is analogous to the antenna apparatus 500 of FIG. 5. The antenna apparatus 700 includes a wireless charging antenna that is the wireless charging coil 502 having the outer periphery 306 (e.g., the outer loop of the wireless charging coil 502) and the inner boundary 308 (e.g., the inner loop of the wireless charging 502). The antenna apparatus 700 also includes a wireless communication antenna that is the wireless communication coil 504 (e.g., the antenna 304 of FIG. 3) including portions 314, 316, and 318. The antenna apparatus 700 also includes communication connector contacts 506 and 508 for coupling to a wireless communication circuit and wireless charging connector contacts 510 and 512 for coupling to a wireless charging circuit.

The antenna apparatus 700, however, differs from the antenna apparatus 500 of FIG. 5 in the configuration of the portion 316 of the wireless communication coil 504. Rather than multiple loops included in the antenna apparatus 500, the portion 316 of the wireless communication coil in the antenna apparatus 700 forms a shape that is less than completely about the location 312 (the center of the center area 310), forming less than a loop around the location 312 within the inner boundary 308 of the wireless charging coil 502. It should be noted that this simplified design of the antenna apparatus 700 does not require a jumper for the portion 316 (e.g., no jumper analogous to the jumper 514 of FIG. 5 need be included in the antenna apparatus 700).

It should be noted that the winding orientation (for example, clockwise or counterclockwise) of the portion 314 of the wireless communication coil 504 and the portion 316 of the wireless communication coil 504 is not kept the same in the example of FIG. 7. For example, if the winding orientation or direction of the portion 314 were clockwise, then the winding orientation or direction of the portion 316 is counterclockwise.

Figure 8:
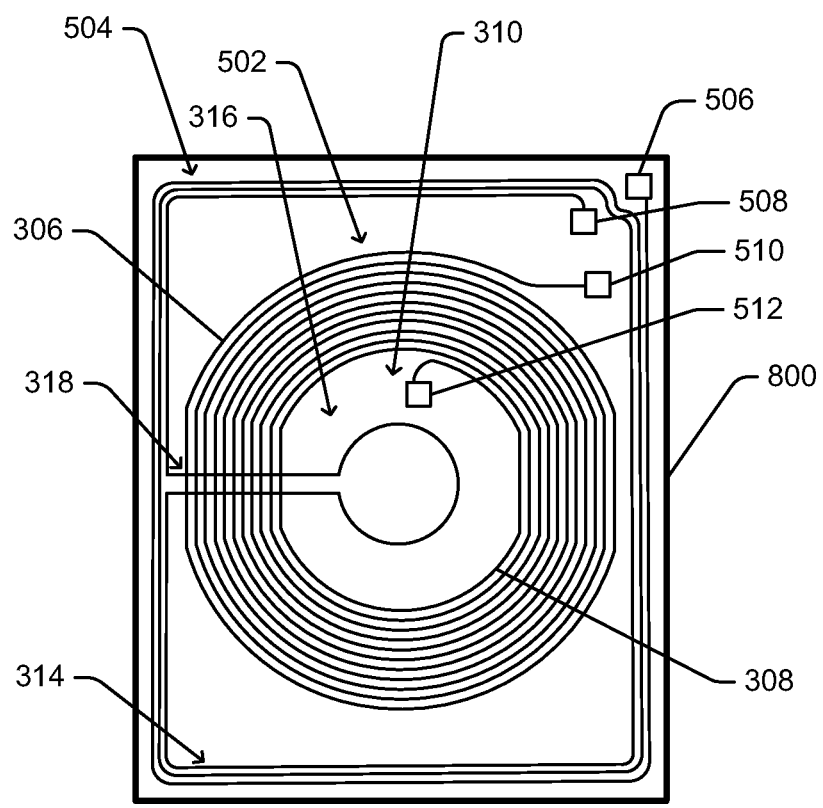

Although illustrated as a shape that is substantially rectangular, it should be noted that the portion 316 can form various other shapes, such as shapes that are substantially circular, shapes that are substantially elliptical, and so forth. For example, FIG. 8 illustrates an example antenna apparatus 800 in which multiple antennas are co-located in accordance with one or more embodiments. The antenna apparatus 800 of FIG. 8 is analogous to the antenna apparatus 700 of FIG. 7, however differs from the antenna apparatus 700 of FIG. 7 in the configuration of the portion 316 of the wireless communication coil 504. Rather than forming a shape that is substantially rectangular, the portion 316 of the wireless communication coil 504 in the antenna apparatus 800 forms a shape that is substantially circular around the center of the center area 310.

Figure 9:
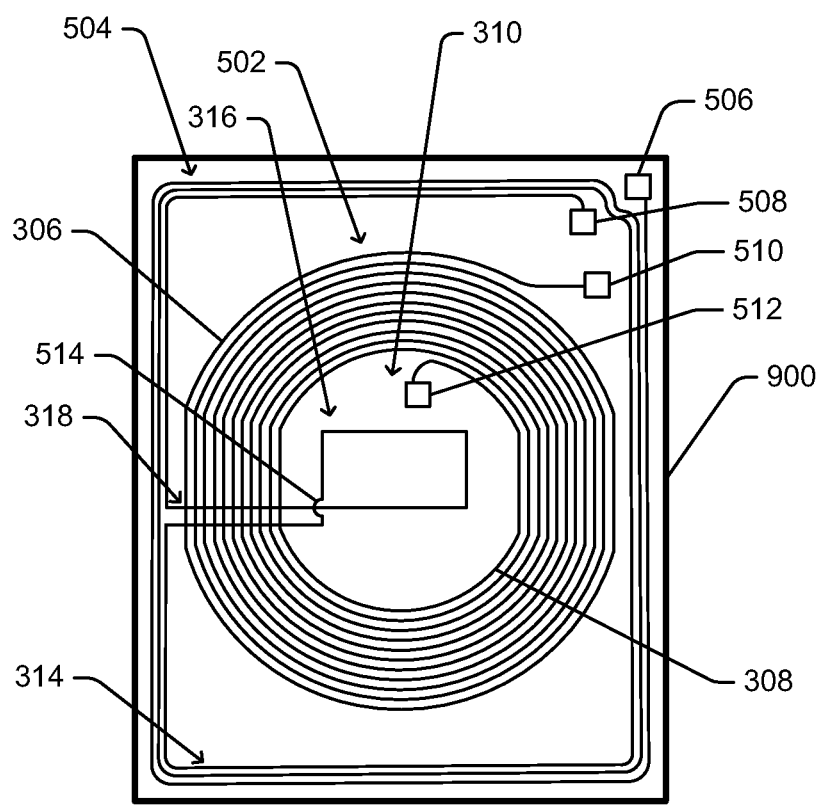

FIG. 9 illustrates an example antenna apparatus 900 in which multiple antennas are co-located in accordance with one or more embodiments. The antenna apparatus 900 of FIG. 9 is analogous to the antenna apparatus 700 of FIG. 7. The antenna apparatus 900 includes a wireless charging antenna that is the wireless charging coil 502 having the outer periphery 306 (e.g., the outer loop of the wireless charging coil 502) and the inner boundary 308 (e.g., the inner loop of the wireless charging 502). The antenna apparatus 900 also includes a wireless communication antenna that is the wireless communication coil 504 (e.g., the antenna 304 of FIG. 3) including portions 314, 316, and 318. The antenna apparatus 900 also includes communication connector contacts 506 and 508 for coupling to a wireless communication circuit and wireless charging connector contacts 510 and 512 for coupling to a wireless charging circuit.

The antenna apparatus 900, however, differs from the antenna apparatus 700 of FIG. 7 in the configuration of the portion 316 of the wireless communication coil 504. Rather than forming a shape that is less than completely about the center of the center area 310, the portion 316 of the wireless communication coil 504 in the antenna apparatus 900 forms a shape that is completely around the center of the center area 310. The portion 316 forms a single loop as illustrated.

The portion 316 of the wireless communication coil 504 in the antenna apparatus 900 also includes the jumper 514 to interconnect two separated ends of the wireless communication coil 504 by passing over or under an intervening trace of the portion 316.

It should be noted that the winding orientation (for example, clockwise or counterclockwise) of the portion 314 of the wireless communication coil 504 and the portion 316 of the wireless communication coil 504 is kept the same in the example of FIG. 9. Keeping the winding orientation the same allows the magnetic field generated by each of the portions 314 and 316 to combine constructively in the center area 310 of the antenna apparatus 900 as discussed above.

Figure 10:
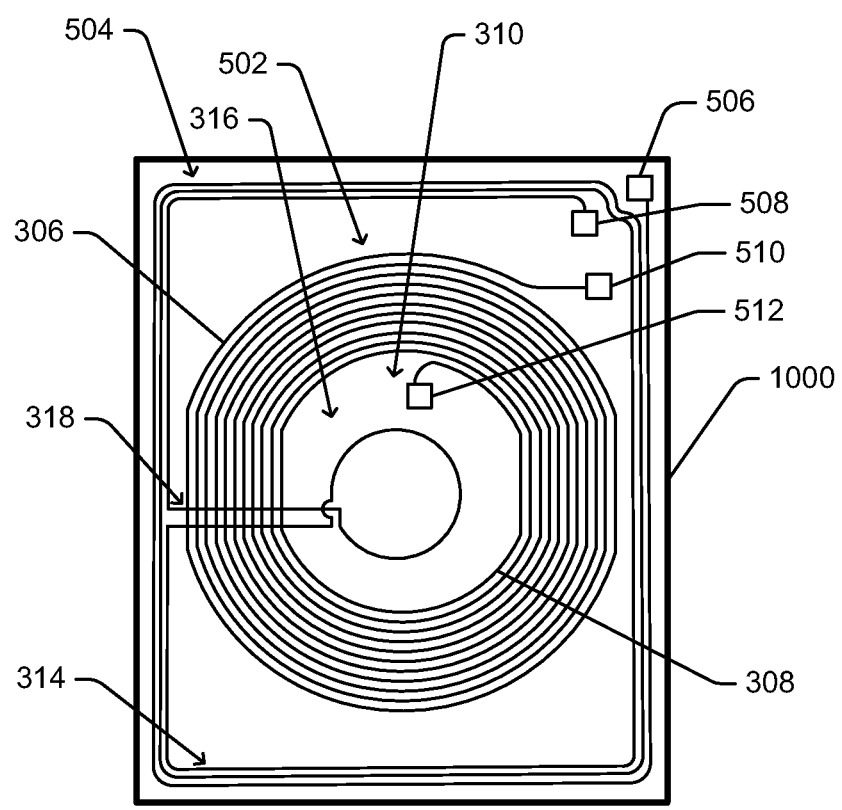

Although illustrated as a shape that is substantially rectangular, it should be noted that the portion 316 can form various other shapes, such as shapes that are substantially circular, shapes that are substantially elliptical, and so forth. For example, FIG. 10 illustrates an example antenna apparatus 1000 in which multiple antennas are co-located in accordance with one or more embodiments. The antenna apparatus 1000 of FIG. 10 is analogous to the antenna apparatus 900 of FIG. 9, however differs from the antenna apparatus 900 of FIG. 9 in the configuration of the portion 316 of the wireless communication coil 504. Rather than forming a shape that is substantially rectangular, the portion 316 of the wireless communication coil 504 in the antenna apparatus 1000 forms a shape that is substantially circular around the center of the center area 310.

Returning to FIG. 3, without the portion 314 of the antenna 304 being situated within the inner boundary 308 of the antenna 302, a "dead zone" can be created in the center area 310. Some devices with which communication with the computing device 102 may be desired may be small enough, or have antennas that are small enough, to effectively fit within this "dead zone". For example, the diameter of the center area 310 may be greater than the diameter of the other device or the antenna of the other device. By extending the portion 314 of the antenna 304 into this "dead zone", the effects of the "dead zone" can be reduced and communication with such other devices improved.

Figure 11:
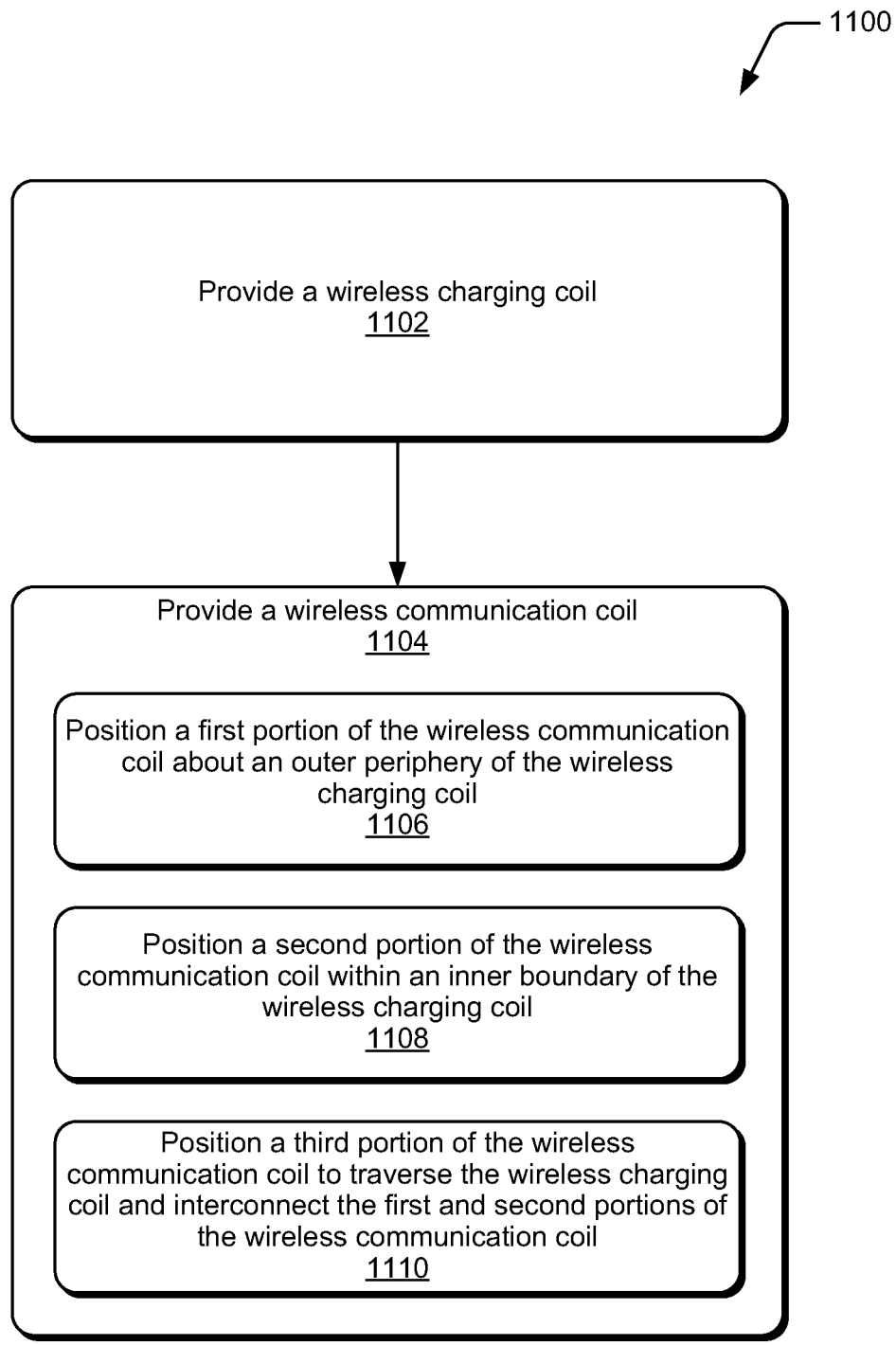
FIG. 11 illustrates an example flowchart for providing a computing device having multiple co-located antennas in accordance with one or more embodiments.

FIG. 11 is an example flowchart 1100 for providing a computing device having multiple co-located antennas in accordance with one or more embodiments. FIG. 11 is shown as a set of acts and is not limited to the order shown for performing the operations of the various acts. Additionally, FIG. 11 is an example of providing a computing device having multiple co-located antennas discussed herein; additional discussions of providing a computing device having multiple co-located antennas are included herein with reference to different FIGS.

In process 1100, a wireless charging coil is provided (act 1102). The wireless charging coil is a trace made of one or more conducting materials, and optionally adjacent to the wireless charging coil is ferrite magnetic shielding designed for operation of the wireless charging coil as discussed above.

A wireless communication coil is also provided (act 1104). The wireless communication coil is also a trace made of one or more conducting materials, and optionally adjacent to the wireless communication coil is ferrite magnetic shielding designed for operation of the wireless communication coil as discussed above. The wireless charging coils and the wireless communication coil are co-located in an antenna apparatus as discussed above.

As part of providing the wireless communication coil, a first portion of the wireless communication coil is positioned about an outer periphery of the wireless charging coil (act 1106). A second portion of the wireless communication coil is positioned within an inner boundary of the wireless charging coil (act 1108). A third portion of the wireless communication coil is positioned to traverse the wireless charging coil and interconnect the first and second portions of the wireless communication coil (act 1110).

Although discussed herein with reference to wireless communication and wireless charging, it should be noted that the multiple antennas can alternatively be associated with other functionality. The techniques discussed herein can be used analogously for other types of functionality, such as any other functionality that uses an inductive coupling with one or more other devices.

Figure 12:
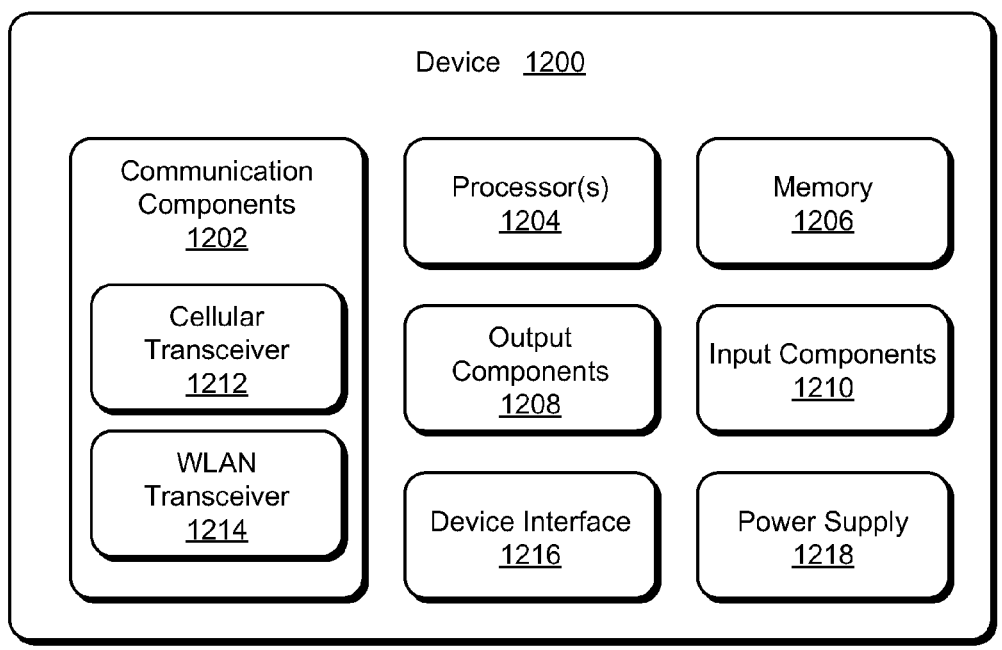
FIG. 12 illustrates an example electronic device that can implement embodiments of the techniques discussed herein.

FIG. 12 illustrates various components of an example electronic device 1200 that can be implemented as a computing device as described with reference to any of the previous FIGS. 1-11. The device 1200 may be implemented as any one or combination of a fixed or mobile device in any form of a consumer, computer, portable, user, communication, phone, navigation, gaming, messaging, Web browsing, paging, media playback, or other type of electronic device such as a computing device 102 described above.

The device 1200 includes one or more communication components 1202, one or more processors 1204, one or more memories 1206, one or more output components 1208, and one or more input components 1210. Each component 1202—1208 can include a user interface that comprises one or more input components 1210. Each communication component 1202 can include a wireless receiver, transmitter or transceiver. Each communication component 1202 can utilize wireless technology for communication, such as, but not limited to, cellular-based communications such as analog communications (using AMPS), digital communications (using CDMA, TDMA, GSM, iDEN, GPRS, or EDGE), and next generation communications (using UMTS, WCDMA, LTE, or IEEE 802.16) and their variants, as represented by cellular transceiver 1212. Each communication component 1202 can also utilize wireless technology for communication, such as, but not limited to, peer-to-peer or ad hoc communications such as HomeRF, Bluetooth and IEEE 802.11 (a, b, g or n); and other forms of wireless communication such as infrared technology, as represented by WLAN transceiver 1214. Also, each communication component 1202 can be a receiver, a transmitter or both.

The device 1200 can further include a device interface 1216 to provide a direct connection to auxiliary components or accessories for additional or enhanced functionality. In addition, the device 1200 includes a power source or supply 1218, such as a portable battery or other power storage component, for providing power to the other example components and allowing portability of the device 1200.

The processor 1204 may generate commands based on information received from one or more communication components 1202 and/or one or more input components 1210. The processor 1204 may process the received information alone or in combination with other data, such as the information stored in the memory 1206. The memory 1206 can be, for example, random access memory, nonvolatile memory (e.g., read only memory, flash memory, erasable programmable read only memory, electrically erasable programmable read only memory, etc.), a magnetic disk storage device, an optical disc storage device, and so forth. Thus, the memory 1206 may be used by the processor 1204 to store and retrieve data. The data that may be stored by the memory 1206 can include, but is not limited to, operating systems, applications, and data. Each operating system includes executable code that controls basic functions of the device 1200, such as interaction among the components of the device 1200, communication with external devices via each communication component 1202 and/or the device interface 1216, and storage and retrieval of applications and data to and from the memory 1206. The memory 1206 includes multiple applications, and each application includes executable code which utilizes an operating system to provide more specific functionality for the portable device. Data is non-executable code or information that may be referenced and/or manipulated by an operating system or application for performing functions of the portable device.

The input components 1210 include at least one wireless communication (e.g., near field communication) sensor and at least one wireless charging sensor. The wireless communication sensor includes a wireless communication coil for receiving wireless communication signals, and the wireless charging sensor includes a wireless charging coil for receiving inductive wireless charging power signals. The wireless communication sensor and the wireless charging sensor may, optionally, transmit signals as well as receive signals. The wireless communication coil and the wireless charging coil may be positioned at or near any housing surface of the device 1200, but the wireless communication coil and the wireless charging coil are co-located with each other.

The input components 1210 may also include components of a user interface, and produce an input signal in response to detecting a predetermined gesture at a first input component 1210, such as a gesture sensor. The user interface and/or gesture sensor may be located at or near the front surface of the housing of the device 1200. An example of a gesture sensor is, but is not limited to, a touch-sensitive sensor having a touch-sensitive surface substantially parallel to the display. The touch-sensitive sensor may include at least one of a capacitive touch sensor, a resistive touch sensor, an acoustic sensor, an ultrasonic sensor, a proximity sensor, or an optical sensor.

The input components 1210 may further include other sensors, such as a visible light sensor, a motion sensor (for example, gyroscope or accelerometer), a proximity sensor, and so forth. Likewise, the output components 1208 of the device 1200 may include one or more video, audio and/or mechanical outputs. For example, the output components 1208 may include a video output component such as a cathode ray tube, liquid crystal display, plasma display, incandescent light, fluorescent light, front or rear projection display, and light emitting diode indicator. Other examples of output components 1208 include an audio output component such as a speaker, alarm and/or buzzer, and/or a mechanical output component such as vibrating or motion-based mechanisms.

Although not shown, the device 1200 can include a system bus or data transfer system that couples the various components within the device 1200. A system bus can include any one or combination of different bus structures such as a memory bus or memory controller, a peripheral bus, a universal serial bus, or a processor or local bus that utilizes any of a variety of bus architectures.

It will be appreciated that some embodiments may be comprised of one or more generic or specialized processors (or "processing devices") such as microprocessors, digital signal processors, a processor and memory system (e.g., implemented in a system on a chip), customized processors and field programmable gate arrays (FPGAs) and unique stored program instructions (including both software and firmware) that control the one or more processors to implement, in conjunction with certain non-processor circuits, some, most, or all of the functions described herein. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used.

Moreover, an embodiment can be implemented as a computer-readable storage medium having computer readable code stored thereon for programming a computer (for example, comprising a processor) to perform a method as described and claimed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It is to be understood that FIG. 12 is provided for illustrative purposes only and for illustrating components of a device in accordance with the techniques discussed herein, and is not intended to be a complete schematic diagram of the various components required for a device. Therefore, a device may include various other components not shown in FIG. 12, may include a combination of two or more components, may include a division of a particular component into two or more separate components, and so forth.

In the discussions herein, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Although embodiments of techniques for a computing device having multiple co-located antennas have been described in language specific to features or methods, the subject of the appended claims is not necessarily limited to the specific features or methods described. Rather, the specific features and methods are disclosed as example implementations of techniques for a computing device having multiple co-located antennas.

What is claimed is:

1. A dual-coil apparatus for facilitating wireless communication and wireless charging, the apparatus comprising:
    a first coil having an outer periphery and an inner boundary; and
    a second coil including first, second, and third portions, wherein:
        the first portion of the second coil is positioned about the outer periphery of the first coil;
        the second portion of the second coil is positioned within the inner boundary of the first coil; and
        the third portion of the second coil traverses the first coil and interconnects the first and second portions of the second coil.

2. The dual-coil apparatus of claim 1, wherein the second portion of the second coil forms a shape completely about a center within the inner boundary of the first coil and includes a jumper over part of the second portion of the second coil.

3. The dual-coil apparatus of claim 1, wherein the second portion of the second coil forms a linear segment at a center area within the inner boundary of the first coil.

4. The dual-coil apparatus of claim 1, wherein the second portion of the second coil forms a shape that is less than completely about a center within the inner boundary of the first coil.

5. The dual-coil apparatus of claim 1, wherein the first coil includes contacts coupled to a wireless charging circuit.

6. The dual-coil apparatus of claim 5, wherein the wireless charging circuit is configured to perform wireless charging of a battery.

7. The dual-coil apparatus of claim 1, wherein the second coil includes contacts coupled to a wireless communication circuit.

8. The dual-coil apparatus of claim 7, wherein the wireless communication circuit is configured to perform near field communication.

9. The dual-coil apparatus of claim 1, wherein one or both of the outer periphery and the inner boundary of the first coil has a substantially circular shape.

10. The dual-coil apparatus of claim 1, wherein one or both of an outer periphery and an inner boundary of the second coil has a substantially rectangular shape.

11. The dual-coil apparatus of claim 1, further comprising:
    a ferrite designed for operation of the first coil positioned adjacent to the first coil; and
    a ferrite designed for operation of the second coil positioned adjacent to the first and second portions of the second coil, wherein the ferrite designed for operation of the first coil and the ferrite designed for operation of the second coil are different.

12. A portable device having wireless communication and wireless charging capabilities, the portable device comprising:
- a wireless charging system including a first coil having an outer periphery and an inner boundary;
- a wireless communication system including a second coil including a first portion, a second portion, and a third portion, wherein:
  - the wireless communication system is configured to perform near field communication;
  - the first portion of the second coil is positioned about the outer periphery of the first coil;
  - the second portion of the second coil is positioned within the inner boundary of the first coil; and
  - the third portion of the second coil traverses the first coil and connects the first portion of the second coil to the second portion of the second coil; and
- a power storage component, coupled to the wireless charging circuit, configured to store energy received by the wireless charging system from an external power source.

13. The portable device of claim 12, wherein the second portion of the second coil forms multiple loops completely about a center within the inner boundary of the first coil and includes a jumper over one or more traces of the second portion of the second coil.

14. The portable device of claim 12, wherein the second portion of the second coil forms a linear segment within the inner boundary of the first coil.

15. The portable device of claim 12, wherein the second portion of the second coil forms a shape that is less than completely about a center within the inner boundary of the first coil.

16. The portable device of claim 12, further comprising:
- a ferrite designed for operation of the first coil positioned adjacent to the first coil; and
- a ferrite designed for operation of the second coil positioned adjacent to the first and second portions of the second coil, wherein the ferrite designed for operation of the first coil and the ferrite designed for operation of the second coil are different.

17. A portable device having wireless communication and wireless charging capabilities, the portable device comprising:
- a housing having front and rear surfaces, wherein a display is viewable at the front surface;
- a wireless charging system including a first coil having an outer periphery and an inner boundary, wherein the wireless charging system is configured for wireless charging of the portable device;
- a wireless communication system including a second coil having first, second, and third portions, wherein:
  - the wireless communication system is configured for near field communication;
  - the first portion of the second coil is positioned about the outer periphery of the first coil;
  - the second portion of the second coil is positioned within the inner boundary of the first coil; and
  - the third portion of the second coil traverses the first coil and interconnects the first and second portions of the second coil, wherein the third portion is positioned between the first coil and the rear surface of the housing.

18. The portable device of claim 17, wherein the first and second coils are co-located at a central region of the rear surface of the housing.

19. The portable device of claim 17, further comprising:
- a ferrite designed for operation of the first coil positioned at a side of the first coil opposite the second housing; and
- a ferrite designed for operation of the second coil positioned at a side of the second coil opposite the second housing, wherein the ferrite designed for operation of the first coil and the ferrite designed for operation of the second coil are different.

20. The portable device of claim 17, wherein the second portion of the second coil forms multiple loops completely about a center within the inner boundary of the first coil and includes a jumper over one or more traces of the second portion of the second coil.

* * * * *